(12) United States Patent
Ikeuchi

(10) Patent No.: US 8,908,212 B2
(45) Date of Patent: Dec. 9, 2014

(54) IMAGE PROCESSING APPARATUS, METHOD FOR CONTROLLING IMAGE PROCESSING APPARATUS, AND STORAGE MEDIUM

(71) Applicant: Canon Kabushiki Kaisha, Tokyo (JP)

(72) Inventor: Yuma Ikeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/786,111

(22) Filed: Mar. 5, 2013

(65) Prior Publication Data

US 2013/0242343 A1    Sep. 19, 2013

(30) Foreign Application Priority Data

Mar. 15, 2012    (JP) ................. 2012-058651

(51) Int. Cl.
| | | |
|---|---|---|
| *G06F 3/12* | (2006.01) | |
| *G03G 15/00* | (2006.01) | |
| *G03G 21/02* | (2006.01) | |
| *G07B 17/00* | (2006.01) | |
| *G07F 19/00* | (2006.01) | |
| *G06F 21/00* | (2013.01) | |
| *G06Q 50/00* | (2012.01) | |
| *H04N 1/00* | (2006.01) | |
| *H04N 1/34* | (2006.01) | |
| *G06Q 20/14* | (2012.01) | |
| *G06Q 20/10* | (2012.01) | |

(52) U.S. Cl.
CPC ........... *H04N 1/00079* (2013.01); *H04N 1/346* (2013.01); *H04N 1/348* (2013.01); *G06Q 20/145* (2013.01); *G06Q 20/102* (2013.01); *H04N 2201/0094* (2013.01)
USPC .............. 358/1.15; 705/30; 705/52; 705/311; 705/418; 399/8; 399/79

(58) Field of Classification Search
USPC ............ 358/1.15, 3.23, 3.24, 1.13, 1.18, 505, 358/501, 401, 403, 305; 715/700, 733, 734, 715/735, 736, 741, 744, 745, 747, 748, 961, 715/962, 965; 705/50, 51, 52, 60, 1.1, 28, 705/29, 300, 311, 400, 418, 30; 399/8, 79
See application file for complete search history.

(56) References Cited

U.S. PATENT DOCUMENTS

| | | | | |
|---|---|---|---|---|
| 6,498,912 | B1 * | 12/2002 | Leni et al. ................. | 399/79 |
| 7,061,634 | B1 * | 6/2006 | Ogura et al. ............... | 358/1.15 |
| 7,124,094 | B1 * | 10/2006 | Kobayashi et al. ........ | 705/64 |
| 7,526,212 | B2 * | 4/2009 | Zwiefelhofer ............. | 399/8 |
| 8,482,750 | B2 * | 7/2013 | Yoshihara .................. | 358/1.14 |
| 8,508,786 | B2 * | 8/2013 | Nagarajan .................. | 358/1.18 |
| 8,630,004 | B2 * | 1/2014 | Iwamoto et al. ........... | 358/1.15 |
| 2002/0073035 | A1 * | 6/2002 | Saito ........................... | 705/52 |
| 2002/0156738 | A1 * | 10/2002 | Irmler ......................... | 705/52 |
| 2005/0179937 | A1 * | 8/2005 | Horihata .................... | 358/1.15 |
| 2009/0180141 | A1 * | 7/2009 | Takaishi et al. ........... | 358/1.15 |

FOREIGN PATENT DOCUMENTS

| | | |
|---|---|---|
| JP | 2008-160531 A | 7/2008 |
| JP | 2011-59254 A | 3/2011 |

\* cited by examiner

*Primary Examiner* — Fred Guillermety
*Assistant Examiner* — Jonathan Beckley
(74) *Attorney, Agent, or Firm* — Canon USA Inc IP Division

(57) ABSTRACT

When an image processing apparatus performs a transmission function of transmitting image data generated by reading a document with a scanner, to a cost management apparatus, the image processing apparatus registers cost information and the image data in the cost management apparatus, the cost information corresponding to user's operation time incurred to perform the transmission function.

14 Claims, 10 Drawing Sheets

FIG.4A
400 MATTER TABLE

| MATTER ID (401) | MATTER NAME (402) | USER ID (403) |
|---|---|---|
| Matter001 | CONTRACT WITH ○○ CORPORATION | User1 |
| Matter002 | CONTRACT WITH △△ CORPORATION | User2 |
| Matter003 | CONTRACT WITH ×× UNIVERSITY | User1 |
| Matter004 | □□ MATTER | User3 |

FIG.4B
410 FILE TABLE

| FILE ID (411) | FILE NAME (412) | MATTER ID (413) | COST ID (414) | REGISTRATION DATE AND TIME (415) |
|---|---|---|---|---|
| File001 | EXPLANATORY MATERIAL.pdf | Matter001 | Cost001 | 2012/01/15 |
| File002 | ADDITIONAL MATERIAL.pdf | Matter001 | Cost002 | 2012/01/15 |
| File003 | PROCEEDINGS.pdf | Matter003 | Cost003 | 2012/01/27 |
| File004 | EXPLANATORY MATERIAL.xps | Matter004 | Cost004 | 2012/02/10 |

FIG.4C
420 COST INFORMATION TABLE

| COST ID (421) | CHARGING METHOD (422) | OPERATION TIME (423) | NUMBER OF SHEETS (424) | MATTER ID (425) | FILE ID (426) | DATE AND TIME (427) |
|---|---|---|---|---|---|---|
| Cost001 | OPERATION TIME | 60 | – | Matter001 | File001 | 2012/01/15 |
| Cost002 | OPERATION TIME | 60 | – | Matter001 | File002 | 2012/01/15 |
| Cost003 | NUMBER OF SHEETS | – | 15 | Matter003 | File003 | 2012/01/27 |
| Cost004 | OPERATION TIME AND NUMBER OF SHEETS | 120 | 30 | Matter004 | File005 | 2012/02/10 |

FIG.4D
430 READ SETTING TABLE

| MATTER ID (431) | COLOR MODE (432) | RESOLUTION (433) | DOCUMENT SIZE (434) | FILE FORMAT (435) | CHARGING METHOD (436) |
|---|---|---|---|---|---|
| Matter001 | COLOR | 300 × 300 | AUTO SIZE | PDF | OPERATION TIME |
| Matter002 | COLOR | 600 × 600 | AUTO SIZE | PDF | OPERATION TIME |
| Matter003 | AUTOMATIC | 300 × 300 | AUTO SIZE | PDF | NUMBER OF SHEETS |
| Matter004 | AUTOMATIC | 600 × 600 | A4 | XPS | OPERATION TIME AND NUMBER OF SHEETS |

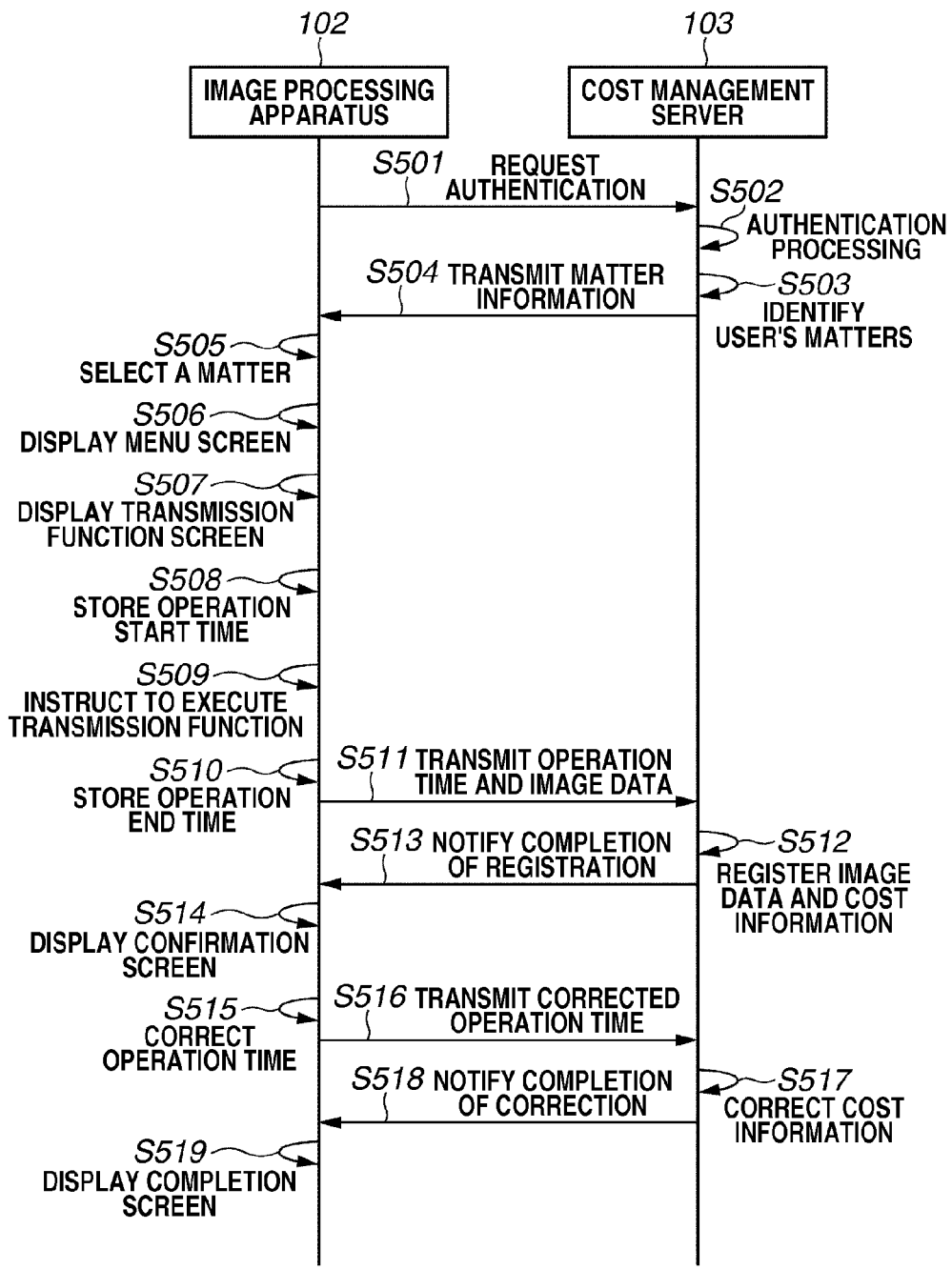

600 LOGIN SCREEN

610 MATTER SELECTION SCREEN

620 MENU SCREEN

FIG.7A

```
SCAN AND TRANSMIT
MAKE SCAN TRANSMISSION SETTINGS.
```
701 — MATTER: CONTRACT WITH ○○ CORPORATION
702 — CHARGING METHOD: OPERATION TIME ▼
703 — FILE NAME: EXPLANATORY MATERIAL.pdf
704 — SCAN AND TRANSMIT 705 — ☑ SAVE SETTINGS
704 — AUTOMATIC COLOR/GRAY SCALE
300 × 300 dpi
AUTO SIZE
PDF
TWO-SIDED DOCUMENT
MIXED DOCUMENT SIZES TO MATTER SELECTION SCREEN | TO MENU SCREEN | Log Out
— 707

700 TRANSMISSION FUNCTION SCREEN

FIG.7B

REGISTRATION COMPLETED
COST INFORMATION HAS BEEN REGISTERED.
FOR CORRECTION, REREGISTER COST INFORMATION.

711 — CHARGING METHOD: OPERATION TIME ▼
712 — OPERATION TIME: 60 (SECONDS)

SCAN AND TRANSMIT — 713

TO MATTER SELECTION SCREEN | TO MENU SCREEN | Log Out

710 CONFIRMATION SCREEN

FIG.7C

REGISTRATION COMPLETED
COST INFORMATION HAS BEEN REGISTERED.
FOR CORRECTION, REREGISTER COST INFORMATION.

721 — CHARGING METHOD: OPERATION TIME AND NUMBER OF SHEETS ▼
722 — OPERATION TIME: 60 (SECONDS)
723 — NUMBER OF SHEETS: 50 (SHEETS)

SCAN AND TRANSMIT — 724

TO MATTER SELECTION SCREEN | TO MENU SCREEN | Log Out

720 CONFIRMATION SCREEN

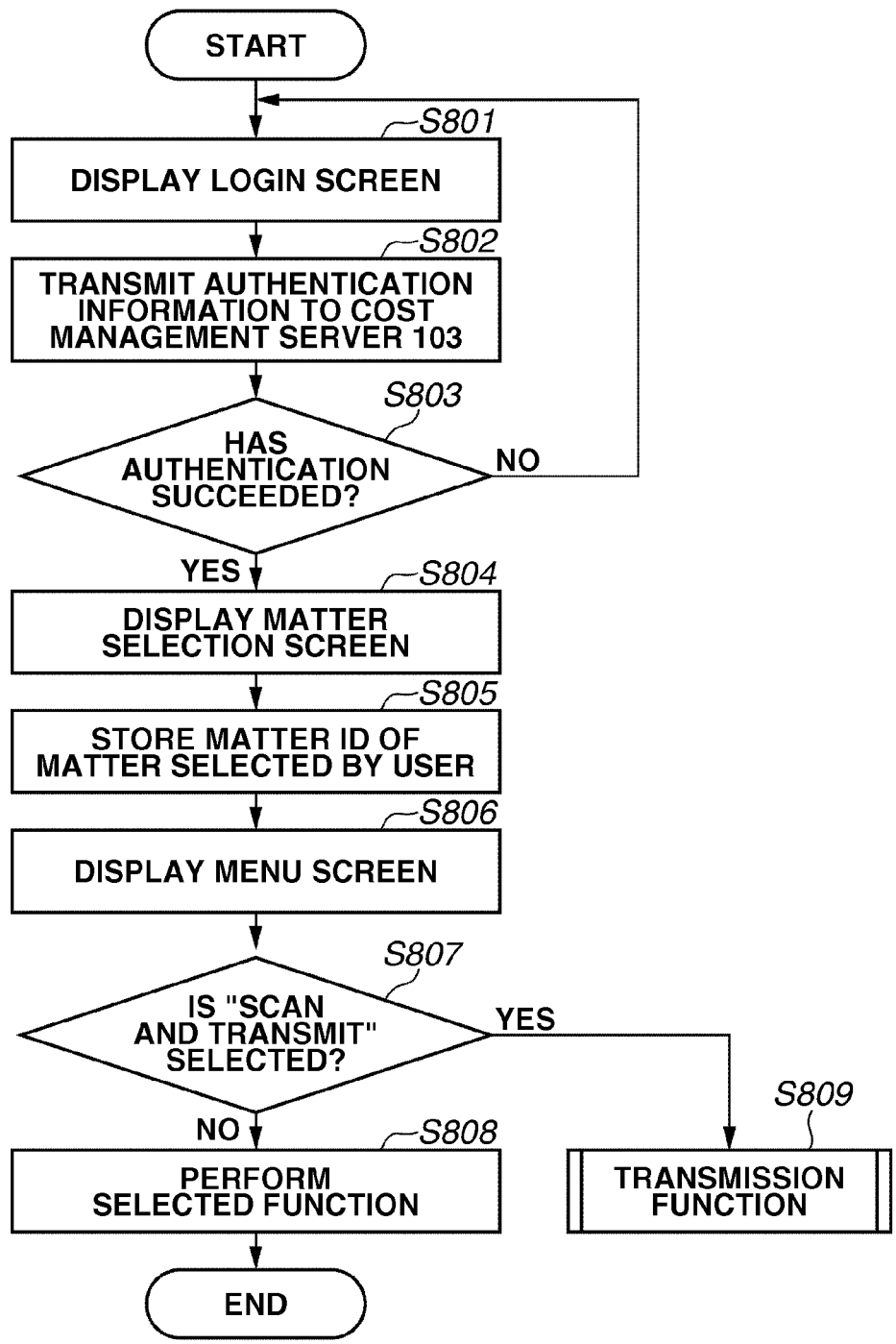

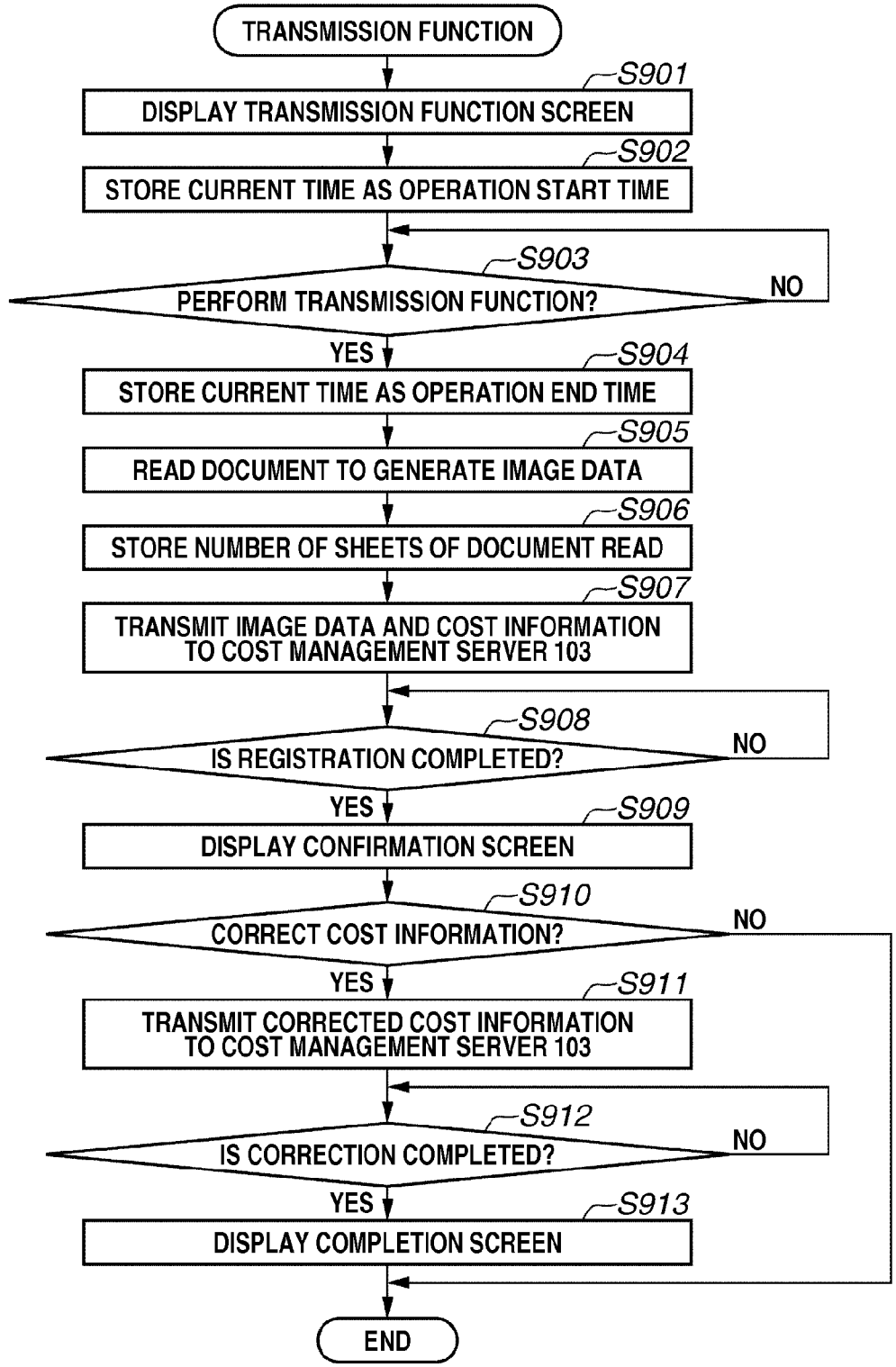

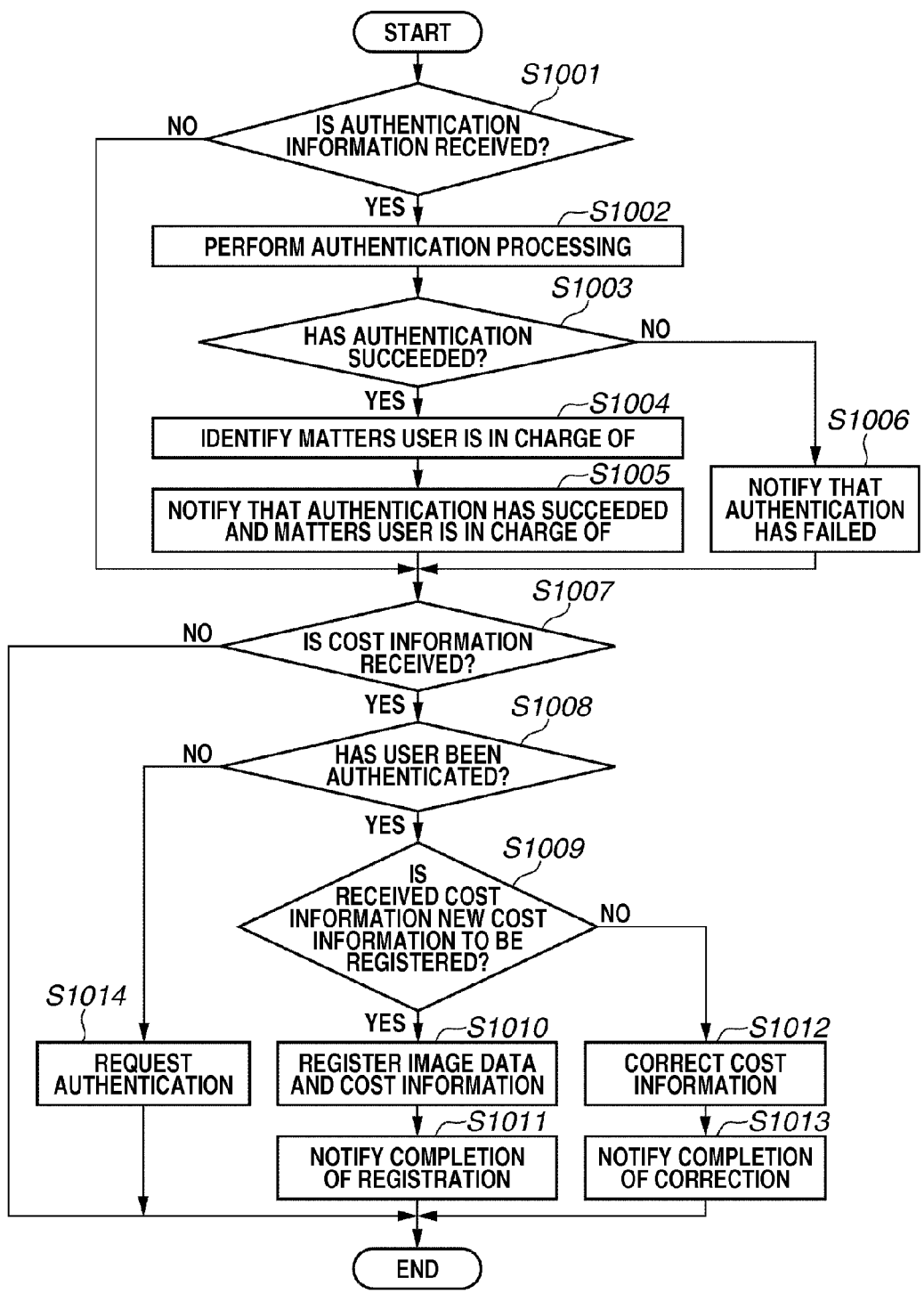

IMAGE PROCESSING APPARATUS, METHOD FOR CONTROLLING IMAGE PROCESSING APPARATUS, AND STORAGE MEDIUM

BACKGROUND OF THE INVENTION

1. Field of the Invention

The present disclosure relates to an image processing apparatus, a method for controlling an image processing apparatus, and a storage medium.

2. Description of the Related Art

When a law firm performs a service operation for a client, costs needed for the service is charged to the client. Specifically, for example, if an image processing apparatus such as a digital multifunction peripheral is used to make copies and/or print as a service, the cost of the copied and/or printed sheets may be charged to the client.

Japanese Patent Application Laid-Open No. 2011-59254 discusses a method for adding up and outputting the number of copied sheets with respect to each of user's work types when the user makes copies by using an image processing apparatus.

An image processing apparatus used in the work may transmit image data generated by reading a document with a scanner to a predetermined storage destination (hereinafter, such a function will be referred to simply as a transmission function). Unlike copying and printing, the transmission function outputs no sheet. The client is then charged for costs concerning the operation time of the work by the user (person who performed the work) as the costs needed for the service. Japanese Patent Application Laid-Open No. 2011-59254 is not capable of adding up such costs concerning operation time.

SUMMARY OF THE INVENTION

The present disclosure is directed to providing a system that can easily register cost information about operation time of a user's operation in a cost management apparatus.

According to an aspect disclosed herein, there is provided an image processing apparatus for communicating with a cost management apparatus, the image processing apparatus including a reception unit configured to receive matter information related to a user from the cost management apparatus, a matter selection unit configured to select a piece of matter information from the matter information received by the reception unit, a reading unit configured to read a document to generate image data, a measurement unit configured to measure the user's operation time, and a registration unit configured to register cost information corresponding to the operation time measured by the measurement unit and the image data generated by the reading unit, in the cost management apparatus each in association with the matter information selected by the matter selection unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles disclosed herein.

FIGS. 4A to 4D are diagrams illustrating various information tables.

FIG. 5 is a sequence diagram illustrating a processing flow according to a first exemplary embodiment.

FIGS. 7A to 7C are diagrams illustrating examples of operation screens.

FIG. 8 is a flowchart illustrating processing to be performed by the image processing apparatus.

FIG. 9 is a flowchart illustrating processing to be performed by the image processing apparatus.

FIG. 10 is a flowchart illustrating processing to be performed by the cost management server.

DESCRIPTION OF THE EMBODIMENTS

Various exemplary embodiments, features, and aspects of the disclosure will be described in detail below with reference to the drawings.

Figure 1:
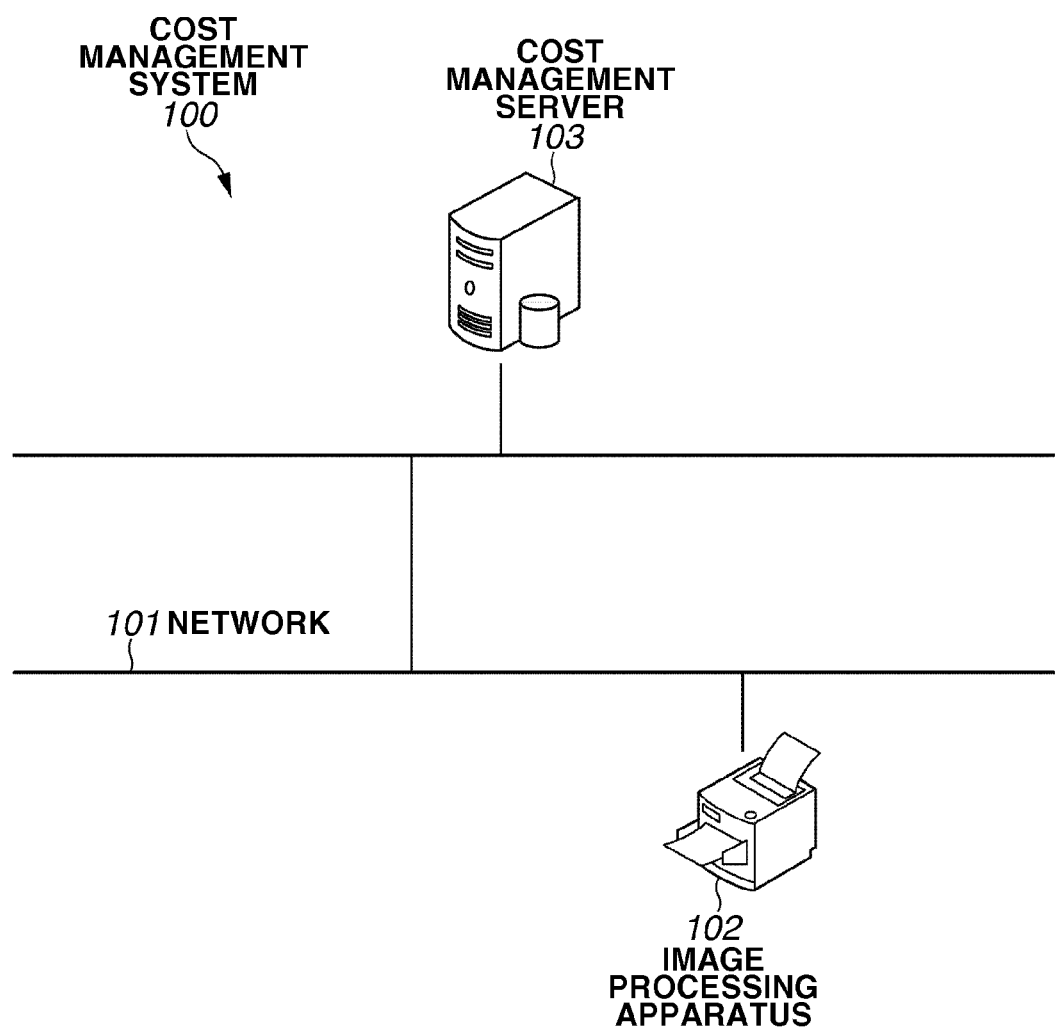
FIG. 1 is a diagram illustrating a cost management system.

A configuration of a cost management system 100 according to the present first exemplary embodiment will be described with reference to FIG. 1.

The cost management system 100 includes an image processing apparatus 102 and a cost management server 103. The image processing apparatus 102 is a digital multifunction peripheral provided with a copy function, a print function, a scan function, and a transmission function. A configuration of the image processing apparatus 102 will be described in detail with reference to FIG. 2. The cost management server 103 is a cost management apparatus that manages, for example, matters to be handled as a law firm's services, materials related to the matters, and cost information indicating costs incurred in the services related to the matters.

The image processing apparatus 102 is installed at a law firm and used for the law firm's services. Costs to be registered in the cost management server 103 as cost information include: costs of sheets the image processing apparatus 102 uses to perform printing and copying; costs incurred in transmitting image data from the image processing apparatus 102 to the cost management server 103; and costs concerning operation time during which a user (person who performs the work) operates the image processing apparatus 102. Clients (clients requesting the matters) are charged according to the cost information registered in the cost management server 103 as the costs incurred in the services.

The image processing apparatus 102 and the cost management server 103 are communicably connected to each other through a network 101 such as the Ethernet (registered trademark). The cost management server 103 may be located on the Internet so that the cost management server 103 provides cloud services about the management of cost information to the image processing apparatus 102. The image processing apparatus 102 and the cost management server 103 may be located in the same local area network.

Figure 2:
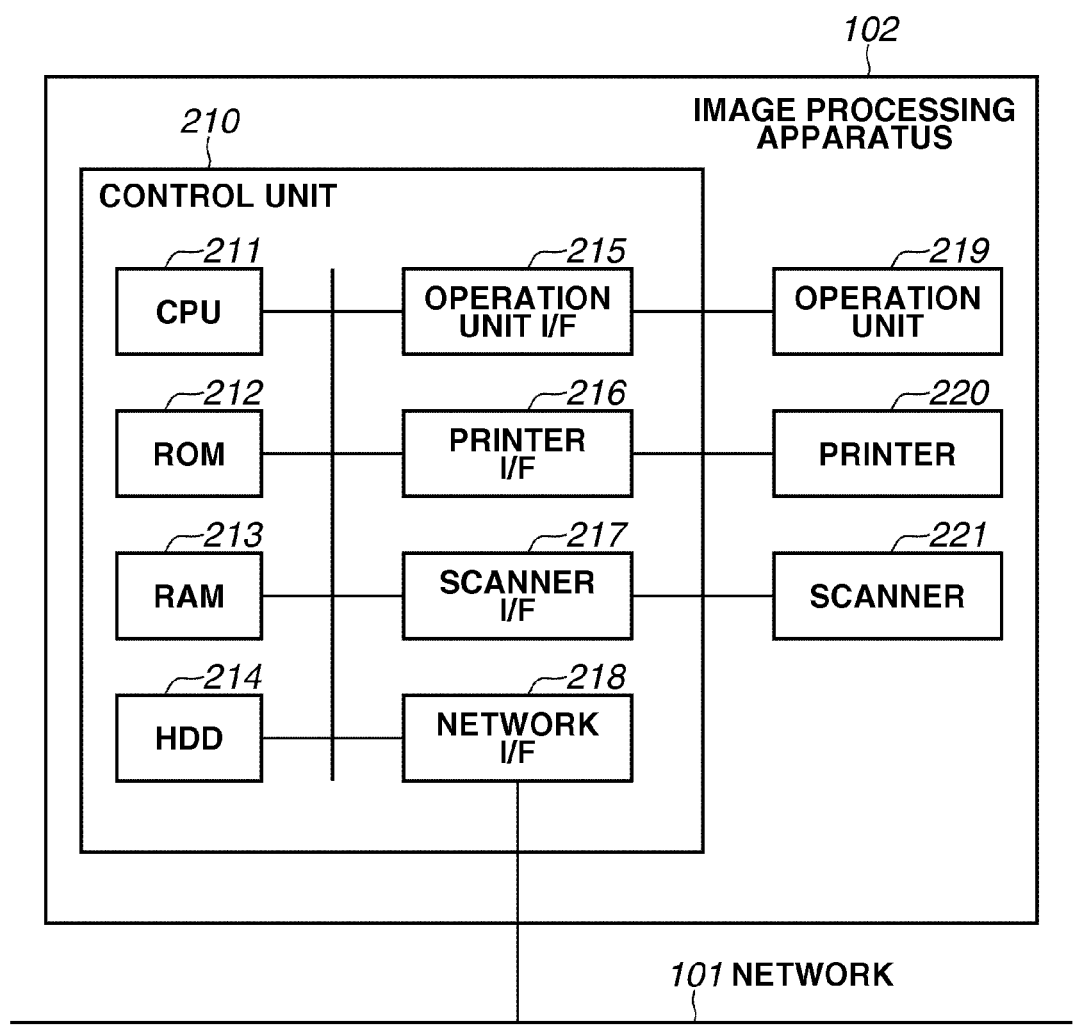
FIG. 2 is a diagram illustrating a configuration of an image processing apparatus.

FIG. 2 is a block diagram illustrating the configuration of the image processing apparatus 102. A control unit 210 including a central processing unit (CPU) 211 controls the operation of the entire image processing apparatus 102. The CPU 211 reads a control program stored in a read-only memory (ROM) 212, and performs various controls including reading processing with a scanner 221 and transmission processing through a network interface (I/F) 218. A random access memory (RAM) 213 is used as temporary storage areas such as a main memory and a work area of the CPU 211. A hard disk drive (HDD) 214 stores image files, various programs, and/or tables to be described below with reference to FIG. 4. While the image processing apparatus 102 is configured such that a single CPU performs processing illustrated by flowcharts to be described below, other embodiments may also be employed. For example, a plurality of CPUs may be provided to perform the processing illustrated by the flowcharts described below in a cooperative manner.

An operation unit I/F 215 connects an operation unit 219 and the control unit 210. The operation unit 219 includes a liquid crystal display unit having a touch panel function and a keyboard. A printer I/F 216 connects a printer 220 and the control unit 210. An image file to be printed by the printer 220 is transferred from the control unit 210 through the printer I/F 216, and printed onto a sheet by the printer 220. A scanner I/F 217 connects the scanner 221 and the control unit 210. The scanner 221 reads a document to generate image data (read processing). The image data generated by the read processing is input to the control unit 210 through the scanner I/F 217.

The network I/F 218 connects the control unit 210 (image processing apparatus 102) to the network 101. The network I/F 218 transmits image data and cost information to the cost management server 103 (transmission processing), and receives various types of information from external apparatuses such as the cost management server 103 on the network 101.

Figure 3:
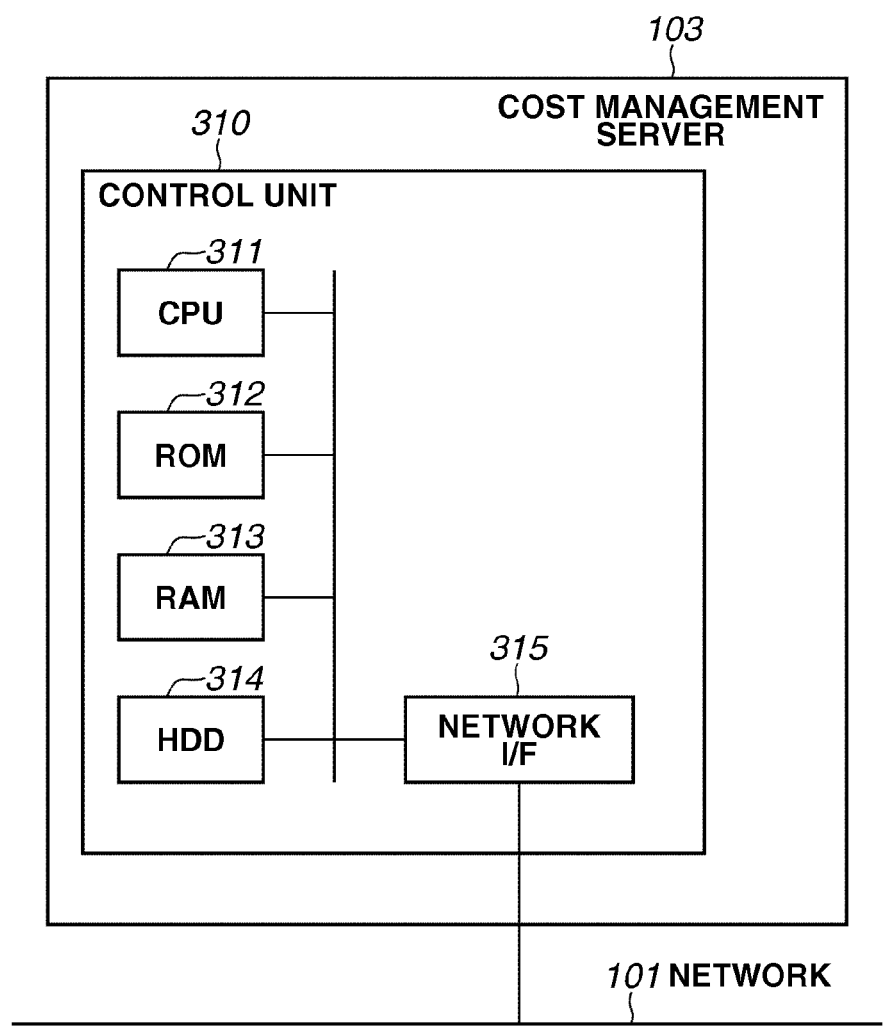
FIG. 3 is a diagram illustrating a configuration of a cost management server.

FIG. 3 is a block diagram illustrating a configuration of the cost management server 103. A control unit 310 including a CPU 311 controls the operation of the entire cost management server 103. The CPU 311 reads a control program stored in a ROM 312 and performs various types of control processing. A RAM 313 is used as temporary storage areas such as a main memory and a work area of the CPU 311. A HDD 314 stores image files, various programs, and/or tables to be described below with reference to FIG. 4. While the cost management server 103 is configured such that a single CPU performs processing illustrated by flowcharts to be described below, other embodiments may also be employed. For example, a plurality of CPUs may be provided to perform the processing illustrated by the flowcharts to be described below in a cooperative manner.

A network I/F 315 connects the control unit 310 (cost management server 103) to the network 101. The network I/F 315 receives image data and cost information transmitted from the image processing apparatus 102, and transmits various types of information to the image processing apparatus 102.

Next, various tables stored in the HDD 214 of the image processing apparatus 102 and the HDD 314 of the cost management server 103 will be described with reference to FIGS. 4A to 4D.

FIG. 4A illustrates a matter table 400, which is stored in the HDD 314 of the cost management server 103. The matter table 400 is a table for managing matters managed by the cost management server 103 (matters the law firm handles). A matter identifier (ID) 401 is identification information that uniquely indicates a matter registered in the matter table 400. A new matter ID is issued each time a new matter is registered in the matter table 400 by the user's operation on a registration screen (not illustrated). A matter name 402 is displayed on operation screens to be described below with reference to FIGS. 6A to 7C. Names from which the user easily comprehends the contents of the matters are preferably set. A user ID 403 is identification information that indicates a person in charge of the matter. In the present exemplary embodiment, one person is put in charge of a matter. However, a plurality of persons may be put in charge of a single matter. A matter name and a person in charge are set on the foregoing registration screen when a new matter is registered in the matter table 400.

FIG. 4B illustrates a file table 410, which is stored in the HDD 314 of the cost management server 103. The file table 410 is a table for the cost management server 103 to manage files related to each matter of the matter table 400. In the present exemplary embodiment, image data generated by the scanner 221 reading a document in the image processing apparatus 102 is transmitted to the cost management server 103. The cost management server 103 receives the image data transmitted from the image processing apparatus 102 and registers the image data in the file table 410.

A file ID 411 is identification information that uniquely indicates a file registered in the file table 410. A new file ID is issued each time a new file is registered in the file table 410. A file name 412 indicates the name of the file registered in the file table 410. A matter ID 413 indicates a matter which the file registered in the file table 410 is related to. A cost ID 414 is an identifier for identifying cost information. The cost information is described in detail in conjunction with a cost information table 420. A registration date and time 415 indicates the date and time when each file is registered in the file table 410.

FIG. 4C illustrates the cost information table 420. The cost information table 420 is a table for managing cost information transmitted from the image processing apparatus 102 to the cost management server 103. The cost information table 420 is stored in the HDD 314 of the cost management server 103. In the present exemplary embodiment, the cost management server 103 manages cost information that indicates costs incurred when the user uses the image processing apparatus 102 in its work.

A cost ID 421 is identification information that uniquely indicates a piece of cost information registered in the cost information table 420. A new cost ID is issued each time a new piece of cost information is registered in the cost information table 420.

A charging method 422 indicates a method by which each piece of cost information is charged. In the present exemplary embodiment, three charging methods including "operation time," "the number of sheets," and "operation time and the number of sheets" are used. The "operation time" is referred to charge for the time of an operation the user performs as its work. For example, if the user performs an operation for 120 seconds to execute the transmission processing of the image processing apparatus 102, an amount corresponding to the 120 seconds is charged to the client.

"The number of sheets" is referred to to charge for the number of sheets the scanner 221 of the the image processing apparatus 102 reads to perform transmission processing. For example, if the scanner 221 reads 20 sheets of a document for the image processing apparatus 102 to perform transmission processing, an amount corresponding to the 20 sheets is charged to the client.

The "operation time and the number of sheets" are referred to to charge for both the time of an operation the user performs as its work and the number of sheets the scanner 221 of the image processing apparatus 102 scans to perform transmission processing.

Operation time 423 indicates the time of an operation the user performs as its work. In the present exemplary embodiment, the operation time 423 is represented by units of "seconds." The operation time 423 is registered if the charging method is "operation time" or "operation time and the number of sheets." The number of sheets 424 indicates the number of sheets the scanner 221 of the image processing apparatus 102 scans to perform transmission processing. In the present exemplary embodiment, the number of sheets 424 is registered if the charging method is "the number of sheets" or "operation time and the number of sheets."

A matter ID 425 indicates a matter which the cost information registered in the cost information table 420 corresponds to. A file ID 426 indicates a file which the cost information registered in the cost information table 420 corresponds to. A date and time 427 indicates the date and time when the cost was registered in the cost information table 420.

In the present exemplary embodiment, operation time and/or the number of scanned sheets are registered in the cost information table 420 as cost information. When charging costs incurred in a service to a client, an amount is calculated based on the operation time and/or the number of sheets (based on a predetermined amount of money per one second of operation time and/or per single sheet), and the amount is charged to the client.

FIG. 4D illustrates a read setting table 430, which is stored in the HDD 214 of the image processing apparatus 102. The read setting table 430 is a table for managing default values of reading settings for the image processing apparatus 102 to perform transmission processing.

Matter IDs 431 are the same identification information as the matter IDs 401 of the matter table 400. In the present exemplary embodiment, default values of the reading settings are determined matter by matter. An operation mode 432 indicates the operation mode of the scanner 221 when reading a document. The operation modes include a monochrome mode, a color mode, and an automatic mode. Resolution 433 indicates reading resolution when the scanner 221 reads a document.

A document size 434 indicates a document size when the scanner 221 reads a document. A file format 435 indicates the file format of image data which the scanner 221 generates by reading a document. A charging method 436 indicates the charging method of each matter. Any one of "operation time," "the number of sheets," and "operation time and the number of sheets" is registered as the charging method 436.

Next, a series of flows for registering cost information in the cost management server 103 will be described with reference to FIGS. 5, 6A to 6C, and 7A to 7C.

Figure 6A:
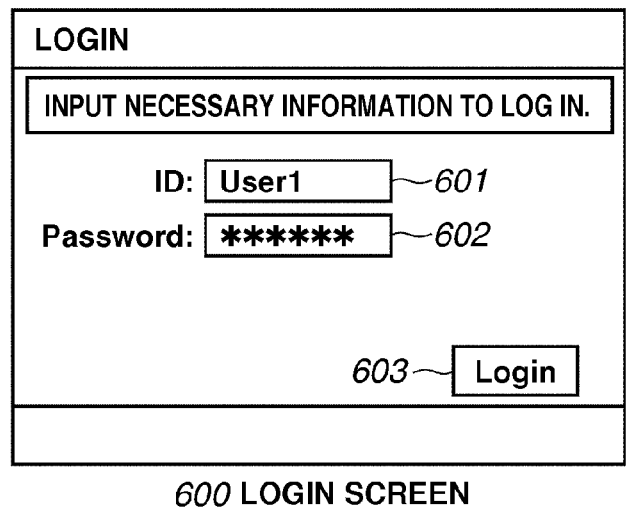
FIGS. 6A to 6C are diagrams illustrating examples of operation screens.

FIG. 5 is a sequence diagram illustrating the series of flows for registering cost information in the cost management server 103. To transmit a material to the cost management server 103, the user moves to the image processing apparatus 102. A login screen 600 illustrated in FIG. 6A is displayed at this time on the operation unit 219 of the image processing apparatus 102. The user inputs a user ID into a field 601 and a password into a field 602, and selects a button 603 (in the present exemplary embodiment, presses the touch panel).

In step S501, the image processing apparatus 102 transmits the input user ID and password to the cost management server 103 as authentication information. In step S502, upon receiving the request for user authentication, the cost management server 103 performs authentication processing. The cost management server 103 manages each user's user ID and password on an authentication table (not illustrated). By using the authentication table, the cost management server 103 determines whether the user of the image processing apparatus 102 is an authorized user.

If the cost management server 103 determines through the authentication processing that the user of the image processing apparatus 102 is an authorized user, then in step S503, the cost management server 103 identifies a matter the user is in charge of based on the matter table 400. If the user ID of the user is User 1, two matters with matter IDs of Matter001 and Matter003 are identified. In step S504, having identified the matters the user is in charge of, the cost management server 103 transmits the matter IDs and matter names of the identified matters to the image processing apparatus 102 as matter information.

Figure 6B:
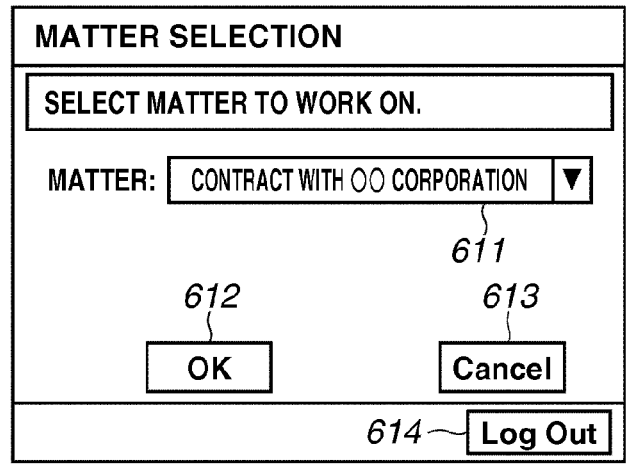

Upon receiving the matter information, the image processing apparatus 102 displays a matter selection screen 610 illustrated in FIG. 6B on the operation unit 219. In step S505, the user selects one of the matters on which an operation is performed from the matter information transmitted from the cost management server 103 by using a select box 611. Here, either the "contract with oo corporation" with a matter ID of Matter001 or the "contract with xx university" with a matter ID of Matter003 is selected. If the user selects a button 613 or 614, the image processing apparatus 102 restores the screen to the login screen 600. If the user selects a matter in the select box 611 and then selects a button 612, then in step S506, the image processing apparatus 102 displays a menu screen 620 illustrated in FIG. 6C on the operation unit 219.

The user selects any one of buttons 621 to 624 on the menu screen 620 to execute a desired function. If a button 625 is selected, the image processing apparatus 102 restores the screen to the matter selection screen 610. If the user selects the button 622, then in step S507, the image processing apparatus 102 displays a transmission function screen 700 illustrated in FIG. 7A on the operation unit 219.

The transmission function screen 700 is a screen for performing a transmission function. If the user selects a button 707, the image processing apparatus 102 restores the screen to the menu screen 620. A field 701 displays the matter name of the matter selected on the matter selection screen 610. The transmission function screen 700 is not capable of changing the matter name. A select box 702 is a box for selecting a charging method. In the present exemplary embodiment, any one of the three charging methods "operation time," "the number of sheets," and "operation time and the number of sheets" can be selected.

A field 703 shows the file name of a file that the scanner 221 generates by reading a document. The user can arbitrarily set the file name. A field 704 shows reading settings for reading a document. The user can make desired reading settings. In the present exemplary embodiment, reading settings registered in the read setting table 430 are applied to the select box 702 and the field 704 as default reading settings.

The user may mark a checkbox 705 if the user has modified the default reading settings and wants to use the modified reading settings as default reading settings thereafter. If the checkbox 705 is marked, the image processing apparatus 102 updates the description of the read setting table 403 after the completion of the transmission processing.

In step S508, in response to the display of the transmission function screen 700, the image processing apparatus 102 stores the time when the transmission function screen 700 is displayed, in the ROM 212 or RAM 213 as operation start time. When the user completes various reading settings, in step S509, the user selects a button 706 to instruct the execution of the transmission function. In step S510, in response to the selection of the button 706, the image processing apparatus 102 stores the time when the button 706 is selected, in the ROM 212 or RAM 213 as operation end time.

When the button 706 is selected, the scanner 221 reads a document to generate image data. In step S511, the image processing apparatus 102 transmits the generated image data and the user's operation time (a difference between the operation start time and the operation end time) to the cost management server 103. While the operation time is used as an example of the cost information here, the number of read sheets may also be used as the cost information. The operation time and the number of read sheets may be both used as the cost information.

In step S512, upon receiving the image data and the operation time transmitted from the image processing apparatus 102, the cost management server 103 registers the image data in the file table 410 and the operation time in the cost information table 420. In step S513, having completed the registration of the image data and the operation time, the cost management server 103 notifies the image processing apparatus 102 that the registration is completed. In step S514, upon receiving the notification, the image processing apparatus 102 displays a confirmation screen 701 illustrated in FIG. 7B on the operation unit 219.

In the present exemplary embodiment, the user can correct the operation time if needed. For example, if the user wants to add to the operation time time taken for an operation that has been done before the operation of the image processing apparatus 102 (time taken to create a document or time taken for the maintenance of the image processing apparatus 102), the user corrects the operation time. A field 712 displays the operation time registered in the cost information table 420. In step S515, the user corrects such operation time. If the user selects a button 713, then in step S516, the image processing apparatus 102 transmits the corrected operation time to the cost management server 103.

In step S517, if the corrected operation time is received, the cost management server 103 corrects the cost information registered in the cost information table 420. In step S518, the cost management server 103 notifies the image processing apparatus 102 of the completion of the correction. In step S519, upon receiving the notification that the correction of the cost information has been completed, the image processing apparatus 102 displays a completion screen (not illustrated) indicating that the correction of the cost information is completed.

After step S519, the transmission function may be performed again by using a different document. Other functions such as the copy function and a facsimile (FAX) function may be successively performed. In matters of the copy function and the FAX function, the user's operation time is also registered in the cost management server 103 as cost information. The user may select another matter on the matter selection screen 610, and perform various functions such as the transmission function and the copy function on another matter. When operations is ended, the user selects the button 614 to log out.

Next, processing to be performed by the image processing apparatus 102 will be described with reference to flowcharts of FIGS. 8 and 9. The steps in the flowcharts of FIGS. 8 and 9 are processed by the CPU 211 of the image processing apparatus 102, which loads a program stored in a memory such as the ROM 212 into the RAM 213 and executes the loaded program.

In step S801, the operation unit 219 of the image processing apparatus 102 initially displays a login screen for performing user authentication. The login screen 600 of FIG. 6A illustrates an example of the login screen displayed at this time. On the login screen 600, the user inputs a user ID into the field 601 and a password into the field 602. If the user selects the button 603 on the login screen 600, the image processing apparatus 102 proceeds to step S802.

In step S802, the network I/F 218 of the image processing apparatus 102 transmits the user ID and password input by the user to the cost management server 103 as authentication information. Based on the authentication information transmitted in step S802, the cost management server 103 performs authentication processing to be described below (step S1002 of FIG. 10).

After transmitting the authentication information to the cost management server 103, the image processing apparatus 102 waits until the image processing apparatus 102 receives a result of the authentication processing from the cost management server 103. In step S803, when the result of the authentication processing is received, the CPU 211 determines whether the authentication has succeeded.

If, in step S803, the CPU 211 determines that the authentication has succeeded (YES in step S803), the image processing apparatus 102 proceeds to step S804. On the other hand, if, in step S803, the CPU 211 determines that the authentication has failed (NO in step S803), the image processing apparatus 102 returns to step S801.

If the authentication has succeeded, the cost management server 103 notifies matter information (matter IDs and matter names) indicating matters the user is in charge of to the image processing apparatus 102.

In step S804, the operation unit 219 of the image processing apparatus 102 displays a matter selection screen for the user to select a matter. The matter selection screen 610 of FIG. 6B illustrates an example of the matter selection screen displayed at this time. The user selects one of the plurality of matters the user is in charge of by using the select box 611. In step S805, if the user selects a matter, the CPU 211 stores the matter ID of the matter selected by the user in the ROM 212 or the RAM 213 and proceeds to step S806. In the following steps, it is assumed that the user has selected the "contract with oo corporation" by using the select box 611 and "Matter001" is stored in step S805.

Figure 6C:
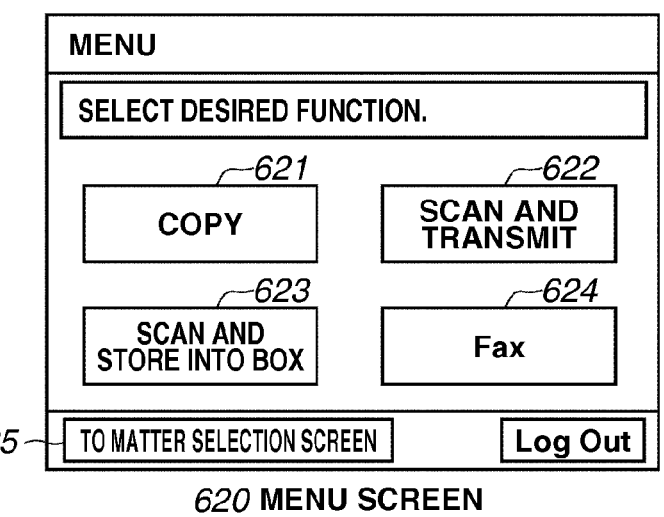

In step S806, the operation unit 219 of the image processing apparatus 102 displays a menu screen for the user to select a desired function. The menu screen 620 of FIG. 6C illustrates an example of the menu screen displayed at this time. On the menu screen 620, the user can select any one of the buttons 621 to 624 to perform a desired function.

If the user selects the button 621, the image processing apparatus 102 performs the copy function of copying a document. If the user selects the button 622, the image processing apparatus 102 performs the transmission function of transmitting image data generated by the scanner 221 for reading a document, to the cost management server 103.

If the user selects the button 623, the image processing apparatus 102 performs a box storage function of storing image data read and generated by the scanner 221 in the HDD 214. If the user selects the button 624, the image processing apparatus 102 performs the FAX function of faxing image data generated by the scanner 221 for reading a document.

In step S807, the CPU 211 determines whether the button 622 is selected by the user. If the CPU 211 determines that the button selected by the user is not the button 622, i.e., the selected button is any one of the buttons 621, 623, and 624 (NO in step S807), the image processing apparatus 102 proceeds to step S808. In step S808, the image processing apparatus 102 performs the function corresponding to the selected button. A detailed description of the copy function, the box storage function, and the FAX function will be omitted.

In step S807, if the CPU 211 determines that the button 622 is selected by the user, the image processing apparatus 102 proceeds to step S809 to perform the transmission processing.

The transmission processing will be described in detail with reference to the flowchart of FIG. 9.

If the button 622 on the menu screen 620 is selected by the user, then in step S901, the operation unit 219 of the image processing apparatus 102 displays a transmission function screen for making settings related to the transmission function. The transmission function screen 700 of FIG. 7A illustrates an example of the transmission function screen displayed at this time.

The select box 702 and the field 704 of the transmission function screen 700 display settings registered in the read setting table 430 as default reading settings. The user can modify such settings. The default reading settings are determined based on the matter ID stored in step S805 (the matter selected by the user). The following steps will be described on the assumption that the transmission function is performed by using the settings illustrated by the transmission function screen 700.

The next step S902 will be described. In step S902, in response to display of the transmission function screen 700 by the operation unit 219 in step S901, the CPU 211 stores the time when the operation unit 219 displays the transmission function screen 700, in the ROM 212 or the RAM 213 as operation start time.

In step S903, the CPU 211 determines whether to perform the transmission function. If the user selects the button 706, the CPU 211 determines to perform the transmission function (YES in step S903), and proceeds to step S904. On the other hand, if the CPU 211 does not determine to perform the transmission function (NO in step S903), the CPU 211 waits until it is determined to perform the transmission function.

In step S904, in response to the selection of the button 622 by the user, the CPU 211 stores the time when the button 622 is selected by the user in the ROM 212 or RAM 213 as operation end time.

In step S905, the scanner 211 reads a document to generate image data. Here, the scanner 221 reads the document and generates the image data based on the reading settings in the field 704.

In step S906, the CPU 211 stores the number of sheets read in step S905 in the ROM 212 or RAM 213. In the present exemplary embodiment, the CPU 211 stores the number of read sheets in step S906 even if the charging method is set to the "operation time" on the transmission function screen 700. The reason is that the user may correct the cost information afterwards (a detailed description will be given in steps S910 and S911).

The CPU 211 will also store the operation start time in step S902 and the operation end time in step S904 even if the charging method is set to "the number of sheets" on the transmission function screen 700. In other words, according to the present exemplary embodiment, the operation start time, the operation end time, and the number of read sheets are stored regardless of the charging method.

In step S907, the network I/F 218 of the image processing apparatus 102 transmits the image data generated in step S905 and cost information to the cost management server 103. The image processing apparatus 102 can thus register the image data and the cost information in the cost management server 103 in association with each other. In step S907, the network I/F 218 also transmits the matter ID stored in step S805 and the user ID to the cost management server 103. The user ID transmitted to the cost management server 103 at this time is used for the determination in step S1008 of FIG. 10 to be described below.

The cost information transmitted in step S907 is cost information according to the charging method selected in the select box 702. If the charging method selected in the select box 702 is "operation time," the network I/F 218 transmits operation time (for example, 60 seconds) determined based on a difference between the operation start time stored in step S902 and the operation end time stored in step S904 to the cost management server 103 as the cost information.

If the charging method selected in the select box 702 is "the number of sheets," the network I/F 218 transmits the number of read sheets stored in step S906 (for example, 50) to the cost management server 103 as the cost information. If the charging method selected in the select box 702 is "operating time and the number of sheets," the network I/F 218 transmits both the operating time and the number of read sheets to the cost management server 103 as the cost information.

In step S908, the CPU 211 waits until the cost management server 103 completes registration of the image data and the cost information transmitted in step S907. If the CPU 211 receives a notification indicating the completion of the registration (step S1011 of FIG. 10 to be described below), the CPU 211 determines that the registration is completed (YES in step S908), and proceeds to step S909.

In step S908, the cost management server 103 notifies the image processing apparatus 102 of the cost information registered by the cost management server 103 and a cost ID corresponding to the cost information, along with the notification indicating the completion of the registration. The CPU 211 stores the cost ID in the ROM 212 or RAM 213.

In step S909, the operation unit 219 of the image processing apparatus 102 displays a confirmation screen for the user to confirm the cost information. The confirmation screen 710 of FIG. 7B is an example of the confirmation screen. The select box 711 of the confirmation screen 710 displays the charging method, and the field 712 displays the cost information registered in the cost management server 103. The user can thus confirm the information registered in the cost management server 103.

The user who has observed the confirmation screen 710, can correct the cost information registered in the cost management server 103 if needed. To correct the operation time, the user can input corrected cost information into the field 712.

In the present exemplary embodiment, the charging method can also be changed. To change the charging method, the user can select a desired charging method in the select box 711. If the user changes the charging method from "operation time" to "operation time and the number of sheets" on the confirmation screen 710, a confirmation screen 720 illustrated in FIG. 7C appears on the operation unit 219. As compared to the confirmation screen 710, a select box 721 is changed to "operation time and the number of sheets."

A field 722 is the same as the field 712. A field 723 is a new field that is added in response to the change of the charging method. The field 723 displays the number of read sheets stored in step S906, so that the user need not input the number of read sheets anew. After having modified the cost information, the user can select the button 713 or a button 724 to transmit the corrected cost information to the cost management server 103.

In the present exemplary embodiment, the charging method can be changed by using the select boxes 702 and 711. However, the charging method may be configured to be unchangeable. If the charging method cannot be changed, all costs incurred in a certain matter can be charged by an integrated and identical charging method.

Step S910 will be described. In step S910, the CPU 211 determines whether to correct the cost information. If the user selects the button 713 or 714, the CPU determines to correct the cost information (YES in step S910), and proceeds to step S911. On the other hand, if the user makes no correction to the cost information (NO in step S910), the image processing apparatus 102 ends the processing illustrated by the present flowchart.

In step S911, the network I/F 218 of the image processing apparatus 102 transmits the corrected cost information to the cost management server 103. The network I/F 218 also transmits the cost ID and the user ID stored in the RAM 213 to the cost management server 103 along with the corrected cost information. The user ID transmitted to the cost management server 103 at this time is used for the determination in step S1008 of FIG. 10 to be described below.

In step S912, the CPU 211 waits until the correction of the cost information is completed. If the CPU 211 receives a notification indicating the completion of the correction of the cost information (step S1013 of FIG. 10 to be described below), the CPU 211 determines that the correction of the cost information is completed (YES in step S912), and proceeds to step S913. In step S913, the operation unit 219 of the image processing apparatus 102 displays a completion screen (not illustrated) indicating that the correction of the cost information is completed.

As described above, according to the flowcharts of FIGS. 8 and 9, the image processing apparatus 102 measures cost information including operation time and the number of read sheets, and transmits the cost information to the cost image server 103 along with image data. The cost information can thus be easily registered in the cost management server 103 without the need for the user to manually register the cost information in the cost management server 103.

Further, to correct the cost information, a cost ID notified from the cost management server 103 can be used to easily associate the uncorrected cost information with the corrected cost information, for example, without the need for the user to specify the cost information to be corrected.

Next, a description is given of the processing which the cost management server 103 performs when the cost management server 103 receives information transmitted from the image processing apparatus 102, with reference to a flowchart of FIG. 10. The steps in the flowchart of FIG. 10 are processed by the CPU 311 of the cost management server 103 which loads a program stored in a memory such as the ROM 312 into the RAM 313 and executes the loaded program.

In step S1001, the CPU 311 determines whether authentication information transmitted from the image processing apparatus 102 is received. If the CPU 311 determines that no authentication information is received (NO in step S1001), the cost management server 103 proceeds to step S1007. If the CPU 311 determines that the authentication information is received (YES in step S1001), the cost management server 103 proceeds to step S1002.

In step S1002, the CPU 311 performs the authentication processing based on a not-illustrated authentication table. In step S1003, the CPU 311 determines whether the authentication has succeeded. If the CPU 311 determines that the authentication has failed (NO in step S1003), the cost management server 103 proceeds to step S1006. In step S1006, the network I/F 315 of the cost management server 103 notifies the image processing apparatus 102 that the authentication has failed. This notification of step S1006 is used for the determination in step S803 of FIG. 8. In step S1003, if the authentication is determined to have succeeded (YES in step S1003), the cost management server 103 proceeds to step S1004.

In step S1004, the CPU 311 identifies matters the user is in charge of from the matter table 400 based on the user ID included in the authentication information. If the user ID is "User 1," two matters with matter IDs of "Matter001" and "Matter003" are identified. In step S1005, the network I/F 315 notifies the image processing apparatus 102 that the authentication has succeeded and of matter information (matter IDs and matter names) indicating the matters identified in step S1004. The notification of step S1004 is used for the determination in step S803 of FIG. 8.

In step S1007, the CPU 311 determines whether cost information transmitted from the image processing apparatus 102 is received. If the CPU 311 determines that no cost information is received (NO in step S1007), the cost management server 103 ends the processing illustrated by the present flowchart. If the CPU 311 determines that the cost information is received (YES in step S1007), the cost management server 103 proceeds to step S1008. The CPU 311 determines that the cost information is received if the cost information transmitted by the image processing apparatus 102 in step S907 or step S911 of FIG. 10 is received.

In step S1008, the CPU 311 determines whether a user ID received together with the cost information is that of the user who has already been authenticated by the authentication processing of step S1002. If the CPU 311 determines that the user has not been authenticated yet (NO in step S1008), the cost management server 103 proceeds to step S1014. In step S1014, the network I/F 315 requests the image processing apparatus 102 to perform authentication. On the other hand, if, in step S1008, the CPU 311 determines that the user has already been authenticated (YES in step S1008), the cost management server 103 proceeds to step S1009.

In step S1009, the CPU 311 determines whether the received cost information is new cost information to be registered. If the cost information transmitted by the image processing apparatus 102 in step S907 of FIG. 9 is received, the CPU 311 determines that the received cost information is new cost information to be registered (YES in step S1009), and proceeds to step S1010. If the corrected cost information transmitted by the image processing apparatus 102 in step S911 of FIG. 9 is received, the CPU 311 determines that the received cost information is not new cost information to be registered but corrected cost information (NO in step S1009), and proceeds to step S1012.

In step S1010, the cost management server 103 receives the cost information, image data, and a matter ID. In step S1010, the CPU 311 registers the received image data in the file table 410 in association with the matter ID, and registers the cost information in the cost information table 420 in association with the matter ID. The CPU 311 can thus associate the registered new cost information, the registered new image data, and the matter information with each other.

In step S1011, the network I/F 315 notifies the image processing apparatus 102 that the registration of the cost information is completed. The network I/F 315 also notifies the image processing apparatus 102 of the cost information registered in the cost information table 420. The notification of step S1011 is used for the determination in step S908 of FIG. 9.

In step S1012, the cost management server 103 receives the corrected cost information and a cost ID. In step S1012, the CPU 311 corrects the cost information designated by the cost ID. In step S1013, the network I/F 315 notifies the image processing apparatus 102 that the correction of the cost information is completed. The notification of step S1013 is used for the determination in step S912 of FIG. 9.

As described above, according to the present exemplary embodiment, the cost information about the operation time spent by the user can be easily registered in the cost management server 103.

In the present exemplary embodiment, the image processing apparatus 102 measures the time during which the transmission function screen 700 is displayed on the operation unit 219, as the user's operation time. However, the timing for measuring the operation time is not limited thereto. For example, the time when the login screen 600 is displayed on the operation unit 219 may be measured as the user's operation start time.

In the present exemplary embodiment, operation time and the number of read sheets are registered in the cost information table 420 as cost information. However, an amount of money calculated by the cost management server 103 or the image processing apparatus 102 based on the operation time and/or the number of read sheets may be registered in the cost information table 420 as cost information.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-058651 filed Mar. 15, 2012, which is hereby incorporated by reference herein in its entirety.

What is claimed is:

1. An image processing apparatus comprising:
a reception unit configured to receive a user's operation to the image processing apparatus;
a reading unit configured to read a document to generate image data;
a measurement unit configured to measure user's operation time based on the user's operation received by the reception unit;
a registration unit configured to register the user's operation time measured by the measurement unit and the image data generated by the reading unit in association with each other; and
a displaying unit configured to display, in a case where the registration unit registers the user's operation time and the image data in association with each other, a correction screen on which a user corrects the operation time measured by the measurement unit,
wherein the registration unit registers, in a case where the user corrects the user's operation time measured by the measurement unit on the correction screen, the corrected user's operation time.

2. The image processing apparatus according to claim 1, wherein the measurement unit measures time during which the displaying unit displays a predetermined operation screen, as the user's operation time.

3. The image processing apparatus according to claim 1, further comprising:
a matter selection unit configured to select a matter to be processed by the user from among a plurality of matters,
wherein the registration unit registers the user's operation time, the image data, and the matter selected by the matter selection unit in association with one another.

4. The image processing apparatus according to claim 3, wherein a reading setting with which the reading unit generates the image data is determined based on the matter selected by the matter selection unit.

5. The image processing apparatus according to claim 1,
wherein the image processing apparatus is communicatable with a server on a network, and
wherein the registration unit registers, to the server, the user's operation time and the image data in association with each other.

6. A method for controlling an image processing apparatus the method comprising:
receiving a user's operation to the image processing apparatus;
reading a document to generate image data;
measuring the user's operation time based on the user's operation received by the reception unit;
registering the user's operation time measured by the measurement unit and the image data generated by the reading unit in association with each other; and
displaying, in a case where the registration unit registers the user's operation time and the image data in association with each other, a correction screen on which a user corrects the operation time measured by the measurement unit,
wherein registering, in a case where the user corrects the user's operation time measured by the measurement unit on the correction screen, the corrected user's operation time.

7. A non-transitory computer-readable storage medium storing a program for causing a computer to perform the method for controlling an image processing apparatus according to claim 6.

8. An image processing apparatus comprising:
a reception unit configured to receive a user's operation to the image processing apparatus;
a reading unit configured to read a document to generate image data;
a measurement unit configured to measure user's operation time based on the user's operation received by the reception unit;
a determining unit configured to determine an amount of money corresponding to the user's operation time measured by the measurement unit;

a registration unit configured to register the amount of money determined by the determination unit and the image data generated by the reading unit in association with each other; and a displaying unit configured to display, in a case where the registration unit registers the amount of money and the image data in association with each other, a correction screen on which a user corrects the operation time measured by the measurement unit, wherein the registration unit registers, in a case where the user corrects the user's operation time measured by the measurement unit on the correction screen, an amount of money corresponding to the corrected user's operation time.

9. The image processing apparatus according to claim 8, wherein the measurement unit measures time during which the displaying unit displays a predetermined operation screen, as the user's operation time.

10. The image processing apparatus according to claim 8, further comprising:

a matter selection unit configured to select a matter to be processed by the user from among a plurality of matters, wherein the registration unit registers the amount of money, the image data, and the matter selected by the matter selection unit in association with one another.

11. The image processing apparatus according to claim 10, wherein a reading setting with which the reading unit generates the image data is determined based on the matter selected by the matter selection unit.

12. The image processing apparatus according to claim 8, wherein the image processing apparatus is communicatable with a server on a network, and wherein the registration unit registers, to the server, the amount of money and the image data in association with each other.

13. A method for controlling an image processing apparatus, comprising:

receiving a user's operation to the image processing apparatus;

reading a document to generate image data;

measuring user's operation time based on the user's operation received by the reception unit;

determining an amount of money corresponding to the user's operation time measured by the measurement unit;

registering the amount of money determined by the determination unit and the image data generated by the reading unit in association with each other; and displaying, in a case where the registration unit registers the amount of money and the image data in association with each other, a correction screen on which a user corrects the operation time measured by the measurement unit, wherein registering, in a case where the user corrects the user's operation time measured by the measurement unit on the correction screen, an amount of money corresponding to the corrected user's operation time.

14. A non-transitory computer-readable storage medium storing a program for causing a computer to perform the method for controlling an image processing apparatus according to claim 8.

* * * * *